May 10, 1966  C. A. SECKERSON  3,249,973
TRIM PAD MOUNTING FASTENER
Filed Dec. 16, 1963

INVENTOR.
Clifford Alexander Seckerson
by. Walter I. Jones,
Attorney.

United States Patent Office 3,249,973
Patented May 10, 1966

3,249,973
TRIM PAD MOUNTING FASTENER
Clifford Alexander Seckerson, Iver Heath, England, assignor to United-Carr Incorporated, a corporation of Delaware
Filed Dec. 16, 1963, Ser. No. 331,022
Claims priority, application Great Britain, Dec. 21, 1962, 48,423/62
3 Claims. (Cl. 24—73)

The present invention relates to an improved fastener which is particularly, although not exclusively suitable for attaching a trim-pad to the body-panel of a vehicle.

According to the present invention there is provided a fastener comprising a stud formed from a mouldable material so as to have a head and a snap-engaging stem extending therefrom, the head having a substantially circular and resilient main flange adjacent the stem and a substantially circular retaining flange spaced, along the length of the head from the main flange, in which the main flange is of greater diameter than the retaining flange and the stem is longitudinally slotted and shouldered intermediate its length, the longitudinal slot extending through the shoulder so as to allow the stem to collapse radially in the region of the shoulder.

Figure 1:
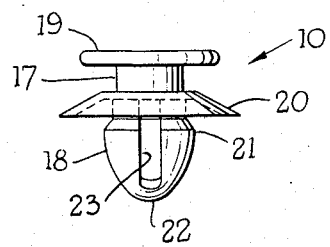
Figure 2:
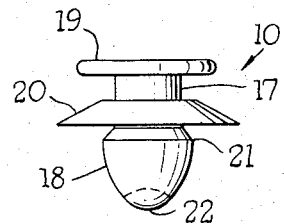
Figure 3:
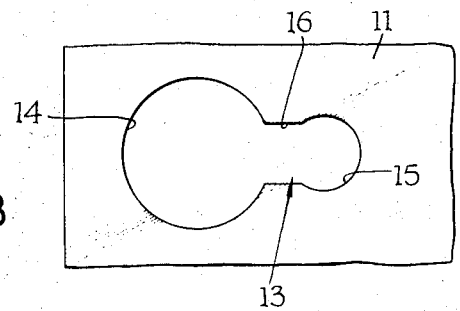
Figure 4:
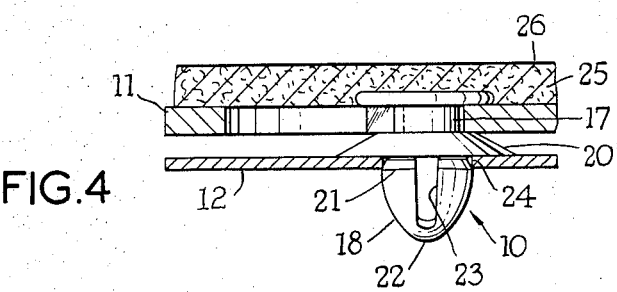

A preferred form of the invention will now be described with reference to the accompanying drawings, in which:

FIGURES 1 and 2 are respectively a front and side elevation of a fastener according to the invention, FIGURE 3 is a plan view of a slot in a trim-pad, and FIGURE 4 is a side-elevation, partly in section, showing the trim-pad of FIGURE 3 secured to a panel with the aid of the fastener of FIGURES 1 and 2.

In FIGURES 1 and 2 a fastener is indicated generally at 10 which is formed from a suitable mouldable material such as a synthetic resin.

The fastener 10 is designed for use in the assembly shown in FIGURE 4 to hold a trim-pad, which is indicated in part at 11 in FIGURE 3, to an apertured panel 12.

As will be seen from FIGURE 4, the trim-pad 11 is covered, on its outer surface, with a padding material 25 and leather trimming 26, and consequently any fastener used to attach the trim pad 11 to a panel has to be introduced from the side opposite to the trimming 26.

The trim-pad 11 is formed around its edge with a series of key-hole shaped slots 13 each of which comprises a major part circular hole 14 joined to a minor part circular aperture 15 by a neck 16 of reduced cross-section.

The fastener 10, a number of which are used to attach the trim-pad 11 to the panel 12, comprises a cylindrical head 17 from which extends a resilient snap-engaging stem 18.

The head 17 terminates in a circular retaining flange 19 and, adjacent the stem 18, it has a resilient circumferential main flange in the form of a skirt 20 which is dished and concave towards the stem, and of greater diameter than the retaining flange.

The stem 18, which on any transverse section therethrough is substantially circular, is formed with an external circumferential shoulder 21 and tapers from the shoulder 21 to its free end or nose 22, which is solid.

A slot 23 having parallel sides extends through the stem 18 and runs from the skirt 20 through the shoulder 21, but terminates short of the solid nose 22.

In order to attach the trim-pad 11 to the panel 12 a fastener 10 is inserted into each slot 13 in the following manner.

The head of the fastener 10 is inserted, retaining flange first, through the major hole 14 until the skirt 20, which is of greater diameter than the hole 14, butts against the under surface of the trim-pad. The cylindrical head 17 of the fastener 10 is then snap-engaged through the neck 16 into the minor hole 15, which is of smaller diameter than both the retaining flange 19 and the skirt 20. In this position the head of the fastener is held to the trim pad by the flange 19 and skirt 20 and cannot slip back through the neck 16, the width of which is slightly less than the diameter of the cylindrical head 17.

When a fastener 10 has been attached in each slot, the trim-pad 11 is brought up to the panel and the stem of each fastener is snap engaged through an aperture 24 which has been preformed in the correct position in the panel.

The slot 23 in the stem 18 gives it resilience and allows it to collapse radially so that the shoulder will snap-engage easily through the circular aperture 24 and the solid tapered nose 22 gives an easy lead in.

As each fastener 10 is pressed fully home into the aperture 24 the resilient skirt 20 is flattened against the outer surface of the panel 12 and forms a seal around the aperture 24.

It will be seen that the fastener of the present invention can be introduced into the key-hole slot 24 head first and from the inner, uncovered side of the trim-pad 11 and thus, when the trim-pad is attached to the panel the fasteners are hidden from view.

In addition, the fastener 10 provides an effective and simple means of attaching the trim-pad to the panel and ensures that the apertures formed in the panel are permanently and effectively sealed while the trim-pad is in position.

What I claim is:

1. The combination including a panel formed with a keyhole-shaped slot, said slot including a relatively large first circular opening, a somewhat smaller second circular opening, and a narrow neck connecting first and second openings, said slot being accessible from one side of the panel only, said panel being secured to an apertured support by a resilient fastener comprising a head and a stem in snapped engagement with the apertured support, the head of the fastener including a resilient annular skirt which is concavely dished toward the stem and held in engagement with the outer surface of the apertured support by the snap action of said resilient fastener in an aperture in said support, and a circular retaining flange of smaller diameter than the circumferential edge of said skirt and spaced from the skirt along the direction of the axis of the stem, the portion of said head between said skirt and said retaining flange being normally seated in the smaller circular opening in said panel, so that said retaining flange overlies one surface of said panel at said smaller circular opening and the skirt abuts the opposite surface of said panel at said smaller circular opening, said portion of said head between said flange and said skirt being of greater diameter than the width of said neck connecting said openings in said panel to resist movement of said fastener into said large opening, said neck and said portion of said head between said flange and said skirt being constructed so that one yields with respect to the other to permit said movement, and said head portion being of smaller diameter than the smaller of said openings to permit a limited amount of play of said head within said smaller circular opening to compensate for reasonable manufacturing error in the placement of the aperture in the support.

2. A fastener for attaching a panel, formed with a keyhole-shaped slot having a large circular opening at one end connected by a narrow neck to a smaller circular opening at the other end, to an apertured support, said fastener comprising a shank adapted for snap engagement into an aperture in the support, said shank having a head at one end thereof, said head having a cylindrical portion, a resilient annular skirt at the end of said cylindrical portion adjacent the shank, and an annular retaining flange at the other end of said cylindrical portion, said retaining flange being of smaller diameter than the circumferential edge of said skirt and being insertable through the larger circular opening of the keyhole slot until the skirt abuts the rim thereof, and said cylindrical portion being slidable along the neck of the slot into the smaller circular opening so that the retaining flange prevents withdrawal of the fastener from the slot in a direction normal to the panel, the diameter of said cylindrical portion being less than the diameter of the smaller circular opening in the panel to allow for limited movement of the fastener transversely of the smaller circular opening for purposes of aligning said shank with an aperture in the support, said shank having means including a retaining structure adapted to coact with portions of the support defining the aperture therein to retain the outer edge of said resilient annular skirt against the surface of the support.

3. A fastener according to claim 2 wherein the end of said shank opposite said head is closed and solid and the shank is provided with a slot having parallel sides and extending axially thereof from a point adjacent said closed end to the line of jointure of said skirt with said cylindrical portion, said slot forming said shank as a resilient element of said retaining structure.

References Cited by the Examiner

UNITED STATES PATENTS

| | | | |
|---|---|---|---|
| 314,053 | 3/1885 | Pearsall | 24—222 |
| 2,505,955 | 5/1950 | Fuller | 24—224 |
| 2,983,008 | 5/1961 | Von Rath | 24—73 |
| 3,029,486 | 4/1962 | Raymond | 24—73 |
| 3,037,596 | 6/1962 | Fordyce | 24—73 X |

WILLIAM FELDMAN, *Primary Examiner.*

DONLEY J. STOCKING, *Examiner.*

E. SIMONSEN, *Assistant Examiner.*